United States Patent [19]

Flowerdew

[11] Patent Number: 5,014,008

[45] Date of Patent: May 7, 1991

[54] SYSTEM FOR DETECTING THE LOCATION AND ORIENTATION OF A TEMPORARILY INACCESSIBLE OBJECT

[75] Inventor: Peter M. Flowerdew, Bristol, United Kingdom

[73] Assignee: Radiodetection Limited, Bristol, United Kingdom

[21] Appl. No.: 465,135

[22] PCT Filed: Jun. 26, 1989

[86] PCT No.: PCT/GB89/00723

§ 371 Date: Feb. 27, 1990

§ 102(e) Date: Feb. 27, 1990

[87] PCT Pub. No.: WO90/00259

PCT Pub. Date: Jan. 11, 1990

[30] Foreign Application Priority Data

Jun. 28, 1988 [GB] United Kingdom ............... 8815313

[51] Int. Cl.$^5$ .................... G01V 3/08; G01V 3/10; E21B 25/16; E21B 47/02
[52] U.S. Cl. ...................................... 324/326; 175/45
[58] Field of Search ........................ 324/326–329; 342/450, 451, 459, 463, 464; 175/45; 166/66

[56] References Cited

U.S. PATENT DOCUMENTS 3,529,682 9/1970 Coyne et al.

FOREIGN PATENT DOCUMENTS 1509914 5/1978 United Kingdom .
2175096 11/1986 United Kingdom .
2197078 5/1988 United Kingdom .

*Primary Examiner*—Walter E. Snow
*Attorney, Agent, or Firm*—Young & Thompson

[57] ABSTRACT

A temporarily inaccessible object such as a locator in a buried pipe has a first transmitter (1) which produces an electromagnetic field rotating about a horizontal axis (A—A) and a second transmitter (7) which produces a solenoidal field centered on that axis. The rotating field is remotely detected at a receiver using a vertical axis coil (6) which locates the object and a reference signal is obtained by a horizontal coil (9) at the receiver. The roll $\alpha$ of the object may be determined by detecting the phase difference between the detected signal and the reference signal. The yaw or angle $\beta$ of departure from a desired horizontal direction is obtained from a maximum output of the horizontal receiver coil (9). With a third transmitter (15) producing another phase related field rotating about a horizontal axis transverse to the first one (A—A) a similar technique at the receiver gives the pitch angle $\gamma$. The position and orientation of the object may be determined in all six degrees of freedom using a portable detector/receiver.

10 Claims, 1 Drawing Sheet

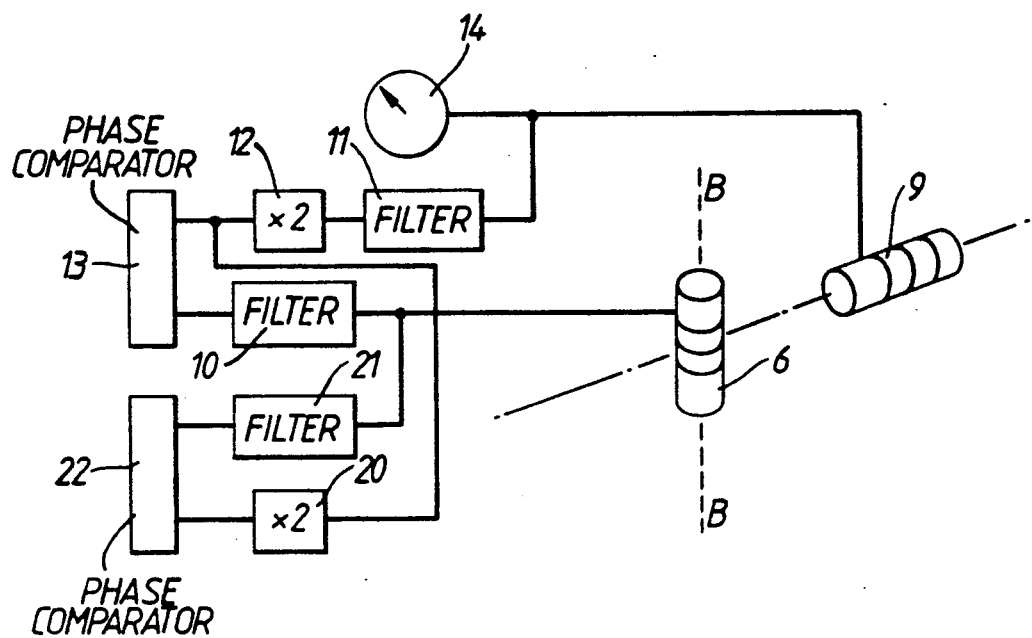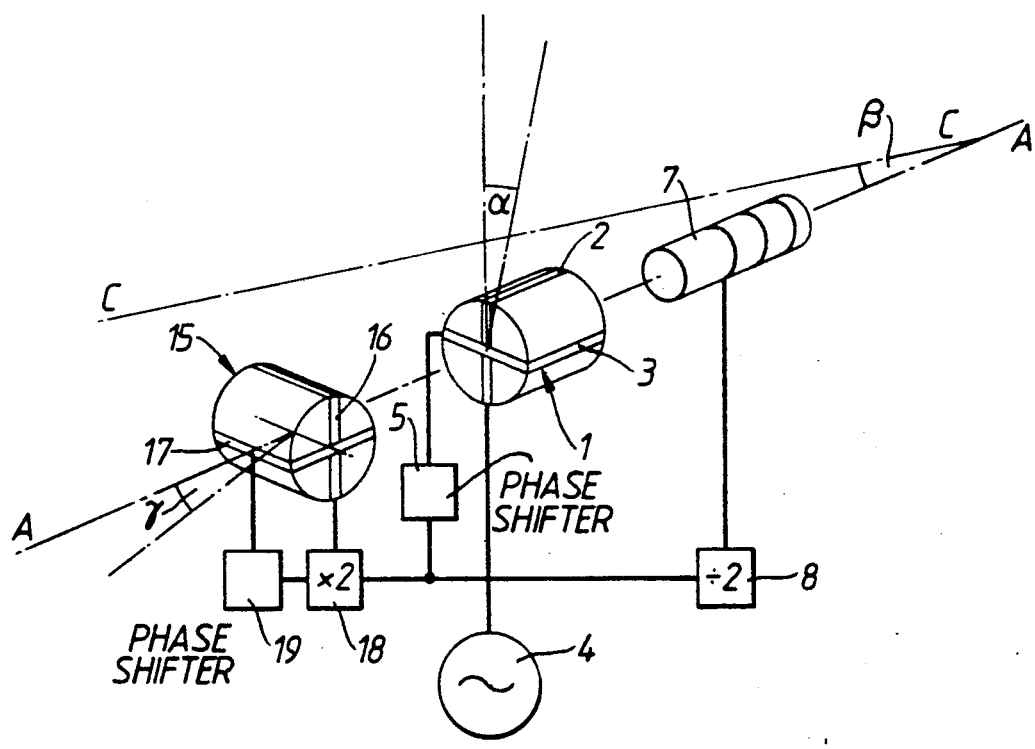

SYSTEM FOR DETECTING THE LOCATION AND ORIENTATION OF A TEMPORARILY INACCESSIBLE OBJECT

This invention relates to the detection of inaccessible objects, and is particularly concerned with the location of underground bodies such as pipes.

It is common practice to extend the use of conventional metallic pipe and cable locators, which detect low frequency electro-magnetic fields, to the location of non-metallic pipes by inserting a transmitting coil into such pipes. The coil may be energised by wires running back to the insertion point or the coil, drive circuitry and battery may be housed in a self contained unit.

GB-2175096A describes arrangements for producing a rotating field that could be used with underground pipe locators or remotely controllable mobile elements, such as soil piercing tools or "moles". The field is that induced in an elongated ferromagnetic element at an acute angle to the axis of rotation of the shaft on which it is mounted, and the exciting coil; energised with A.C. is usually co-axial with the shaft and preferably stationary.

This has a number of disadvantages. For example, the mole or locator body does not necessarily rotate, and indeed must be prevented from doing so for certain remote control systems to operate properly. Therefore a rotary shaft has to be fitted, with the means to drive it. Also, although the ferromagnetic element may be in static balance, once rotating there will in effect be two masses diametrically opposed but at axially spaced positions, thus creating a dynamic imbalance leading to substantial vibration. While this is cured by an elaborate counterbalancing system, the whole apparatus is then complex and expensive, as well as being quite bulky.

GB-2197078A describes a positional information system applicable to moles, where the mole is equipped with a receiver having three coils with mutually perpendicular axes to pick up signals from a corresponding transmitter coil assembly. The transmitter coils are energised in pairs to produce a response at the receiver, which is fed back along an umbilical cable trailing behind the mole. From this, the roll, pitch and yaw of the mole can be determined and, if it is a steerable mole, control signals can be fed back along the cable.

That system also has certain drawbacks. The transmitter is positioned below ground in an access pit, in line with the projected hole to be bored. It has to be accurately set up so that all the coil axes are correctly oriented. This is tricky and time consuming, and it is very vulnerable to being knocked skew, particularly if the pit is used by workmen while boring is in progress. Also, on a long bore, the transmitted signals may be weak and distorted, by anomalies in the ground or buried ferromagnetic objects for example, by the time they reach the receiver, giving an incorrect response. It is not a good system for tracing a travelling probe in existing pipelines, since placement and securing of the transmitter is not always possible in the confined space available, and since pipelines often bend or snake to a degree that, as with long bores with a mole, the signal transmission is unreliable. Moreover, providing signal lines in the trailing cable adds to its bulk and weight, which accentuates the drag as the bore advances.

It is therefore highly desirable to provide a simple, more robust system, avoiding if possible the radiation over long distances of a complex mix of accurately oriented signals towards an inaccessible object such as a pipe locator or mole. At the same time it is important to provide the facility for determining the orientation of the body with reference to a caretesian frame, that is to measure the roll, yaw and pitch of the object. That has particular application to underground boring and tunnelling devices and may constitute part of the location and guidance system for such devices.

According to one aspect of the present invention there is provided a system for detecting the location and orientation of a temporarily inaccessible object, such as a boring mole or a locator unit in an underground pipeline, comprising providing that object with first means for generating a rotating electromagnetic field, and detecting the presence of the object from the electromagnetic radiation by coil aerial means at a receiver, characterised in that the object is further provided with second means for generating a further electromagnetic field of frequency and phase related to the rotating field, and in that the receiver is further provided with means for deriving from the further field a reference frequency and with means for relating to that reference frequency the signal from the rotating field as received by an aerial of the coil aerial means having a set orientation, the phase difference being indicative of the departure of the first generating means, and hence of said object, from a base orientation.

In one preferred form the rotating field is provided by A.C. energised out-of-phase coils with mutually transverse axes, and conveniently these will be perpendicular to the principal axis of the object. With a locator that principal axis will be aligned with the pipe. The further generating means may be a single coil co-axial with the principal axis and produce a solenoidal field. The frequency of the latter is conveniently a simple multiple or fraction of that in the other coils, for example half. The receiver coil aerial means may comprise vertical and horizontal coils, and preferably the vertical one or ones are used first for location. With the object located, its orientation in the horizontal plane can be determined by a peak in the horizontal receiver coil response, indicating that it is parallel to the single coil of the further generating means.

With the receiver immediately above the transmitters and with the horizontal coils just referred to parallel, the rotating field will then just induce a response in the vertical receiver coil. The phase of that response, in relation to the reference frequency obtainable from the horizontal receiver coil, will indicate by how much the object has rolled, taking the rotating field coils away from a datum orientation where the axis of one such coil is vertical.

In a further development, the object may be provided with third means for generating a different rotary electromagnetic field, frequency and phase related to the other fields. Its frequency will preferably be a simple multiple or fraction of that of the first rotary field, for example double, and thus four times that of the further field. It will conveniently be provided by A.C. energised, out-of-phase coils with mutually transverse axes and be arranged to rotate about a normally horizontal axis, perpendicular to the principal axis. From the response at the receiver its phase relationship to the reference frequency and thus the pitch of the object can be determined, in a similar manner to the roll.

According to another aspect of the present invention there is provided a system for locating a temporarily inaccessible object, such as a boring mole or a locator unit in an underground pipeline, characterised by providing said object with two coils (2,3) with axes transverse to each other and to a generally horizontal axis of the object, and with means (4) for energising the coils with A.C. so that one coil is out of phase with the other to create an electromagnetic field rotating about said horizontal axis, and by a receiver having a coil (6) whose axis is held generally vertical and means for indicating a maximum output from said receiver coil, thereby to indicate the position of said object.

For a better understanding of the invention, one embodiment will now be described, by way of example, with reference to the accompanying drawing, in which the single FIGURE is a diagram illustrating the relationship between transmitters on an underground object, such as a pipe locator or mole, and an above ground receiver.

A first transmitter 1 has two coils 2 and 3 with axes mutually at right angles, that of the coil 2 being normally horizontal and that of the coil 3 normally being vertical, and both being perpendicular to a horizontal axis A—A corresponding to the axis of an underground body such as a pipe locator or mole, for example. This may carry its own A.C. generator 4 and 90° phase shifter 5 by which the coils 2 and 3 are energised to create an electromagnetic field rotating about the axis A—A.

It is well established that an underground object radiating an electromagnetic field can be accurately located by an above-ground detector with one or more receiver coils in various orientations, and that, with two coils, a depth measurement can be obtained. See, for example, GB-1509914. In the present system, the receiver has a single coil 6 whose axis is held vertical in the normal detecting attitude, but it will be understood that there could be two aligned coils. In any event, the coil 6 is first used to locate the transmitter 1 and thus enable the receiver to be positioned directly over the body carrying the transmitter. This method, using a rotary field and a vertical axis search coil, has substantially greater ease and precision than any other method so far known to us.

In GB-2197078A it is described how, with multi-coil transmitters and receivers, the phase of the signal in each receiver coil is advanced or retarded from the phase of the voltage applied to either of two transmitter coils by relative mechanical rotation, the transmitter coils being those whose axes define a plane parallel to or containing the axis of the receiver coil.

Thus, the rotation of the transmitter coils 2 and 3 about the mutually orthogonal axis by $\alpha°$ will advance the phase of the signal at the receiver coil 6 by $\alpha°$ relative to the phase of the voltage applied to the coil 2, taken to be the reference coil.

To determine the mechanical rotation of the transmitter 1 about A—A (which will be the roll angle $\alpha$ of the underground body) it is necessary to provide a reference signal at the receiver. The underground body therefore has a second transmitter in the form of a third coil 7 co-axial with A—A and energised with a phase related voltage at a different frequency from that of the transmitter 1. For example, it could be half that frequency, being derived from the generator 4 through a divider 8. This produces a field of solenoidal form which will be picked up by a normally horizontal coil 9 at the receiver.

Each receiver coil 6 and 9 will of course be influenced to some extent, even in the relative positions shown, by the magnetic fields from both transmitters, but the separation of the signals is readily achieved by filters 10 and 11. Then a frequency doubler 12 in the output channel from the coil 9, which may include a full wave rectifier and filter for example, allows the reference for the rotating field to be reconstructed in the receiver. This is applied to a phase comparator 13; whose other input is from the coil 6, and so measurement of the roll angle $\alpha$ is achieved.

The arrangement shown also enables the bearing or yaw angle $\beta$ of the underground body (that is the horizontal direction of A—A) to be determined. This is done by rotating the receiver about vertical axis B—B (co-incident with that of coil 6) after locating the transmitter 1 by the coil 6 as referred to previously. The output of the coil 9 is monitored by unit 14 and rotation stopped when a peak is detected. This will occur when the geometry shown is achieved, namely when the axis of coil 9 is parallel with A—A. The user will have an expected or desired bearing C—C, which might be marked on the ground or noted as a compass bearing for example, and by reference to this he can determine the yaw angle $\beta$.

To obtain the pitch angle $\gamma$ (that is the deviation of A—A from the horizontal) a second rotating field transmitter 15 is added to the underground body. This has two mutually orthogonal coils 16 and 17 whose axes are respectively co-incident with A—A, and normally vertical, the former being taken to the reference coil. The voltage supplied to them is phase related but at a different frequency to the other transmitters and is derived from the generator 4. For example, it could be double the frequency of the transmitter 1, requiring a frequency doubler 18 and 90° phase shifter 19 to produce a field rotating about a horizontal axis at right angles to A—A, which will be picked up by the receiver coil 6.

A reference frequency will be required at the receiver, as for the roll angle measurement. This again is readily obtained from the coil 9, through a second frequency doubler 20, while the desired frequency from the coil 6 is obtained through a filter 21. Another phase comparator 22 will give the pitch angle $\gamma$.

In practice, the separation of the transmitters and the distance between the underground body and the receiver is such that the receiver coils 6 and 9 may be placed one over the other or alongside each other in cruciform, without introducing significant errors to the measurements of position and angle described. Indeed the coils 6 and 9 could be an overlapping arrangement similar to those of the transmitters 1 and 15.

The equipment and procedure described above allow the position and orientation of a temporarily inaccessible body suitably equipped with transmitters, in all six degrees of freedom, to be determined by an operator with a portable receiving instrument.

I claim:

1. A system for detecting the location and orientation of a temporarily inaccessible object, such as a boring mole or a locator unit in an underground pipeline, comprising providing that object with first means (1) for generating a rotating electromagnetic field, and detecting the presence of the object from the electromagnetic radiation by coil aerial means (6) at a receiver, characterised in that the object is further provided with second means (7) for generating a further electromagnetic field of frequency and phase related to the rotary field, and in that the receiver is further provided with means (9) for deriving from the further field a reference frequency and with means (13) for relating to that reference frequency the signal from the rotating field as received by an aerial (6) of the coil aerial means having a set orientation, the phase difference being indicative of the departure ($\alpha$) of the first generating means, and hence of said object, from a base orientation.

2. A system according to claim 1, characterised in that said means (1) for generating a rotating magnetic field includes A.C. energised, out-of-phase coils (2,3) with mutually transverse axes.

3. A system according to claim 2, characterised in that the rotating field coils (2,3) have axes perpendicular to a principal axis (A—A) of the object, and in that the further generating means includes a coil (7) co-axial with said principal axis and produces a solenoidal field.

4. A system according to claim 1, characterised in that the frequency of the further electromagnetic field is a simple multiple or fraction of that in the other coils, for example half.

5. A system according to claim 1, characterised in that the receiver coil aerial means comprise vertical and horizontal coils (6,9).

6. A system according to claim 5, characterised in that the vertical receiver coil (6) or coils have associated means indicating a peak response thereby to locate the object.

7. A system according to claim 6, characterised in that, with the object located, its orientation in the horizontal plane is determined by means (14) indicating a peak response in the horizontal receiver coil.

8. A system according to claim 1, wherein the object is provided with third means (15) for generating a different rotating electromagnetic field, frequency and phase related to the other fields.

9. A system according to claim 8, characterised in that the frequency of said different rotating electromagnetic field is a simple multiple or fraction of that of the first rotating field, for example double.

10. A system according to claim 8, characterised in that one of the said rotating electromagnetic fields rotates about a pitch axis of said object and the other electromagnetic field rotates about a roll axis (A—A) whereby the orientation of the object in the pitch and roll senses may be determined.

* * * * *